J. E. McMAHAL.
PLUMB LEVEL.
APPLICATION FILED OCT. 30, 1908.

937,631.

Patented Oct. 19, 1909.

Witnesses:
Phil. E. Barnes
P. J. Elmore

Inventor
James E. McMahal.
By Victor J. Evans.
Attorney

UNITED STATES PATENT OFFICE.

JAMES E. McMAHAL, OF HOMELAND, GEORGIA, ASSIGNOR OF ONE-HALF TO WILLIAM H. THOMPSON, OF HOMELAND, GEORGIA.

PLUMB-LEVEL.

937,631.

Specification of Letters Patent.

Patented Oct. 19, 1909.

Application filed October 30, 1908. Serial No. 460,270.

*To all whom it may concern:*

Be it known that I, JAMES E. MCMAHAL, a citizen of the United States, residing at Homeland, in the county of Charlton and State of Georgia, have invented new and useful Improvements in Plumb-Levels, of which the following is a specification.

This invention relates to plumb levels of the type employed in the truing of walls and other portions of buildings, and has for its objects to provide a comparatively simple, inexpensive device of this character which may be readily employed for use as either a plumb or level, one whereby the foundation of a building may be accurately laid in any desired direction, and one wherein the operation of plumbing and leveling a wall may be conveniently and accurately accomplished.

With these and other objects in view the invention comprises the novel features of construction and combination of parts more fully hereinafter described.

Figure 1:
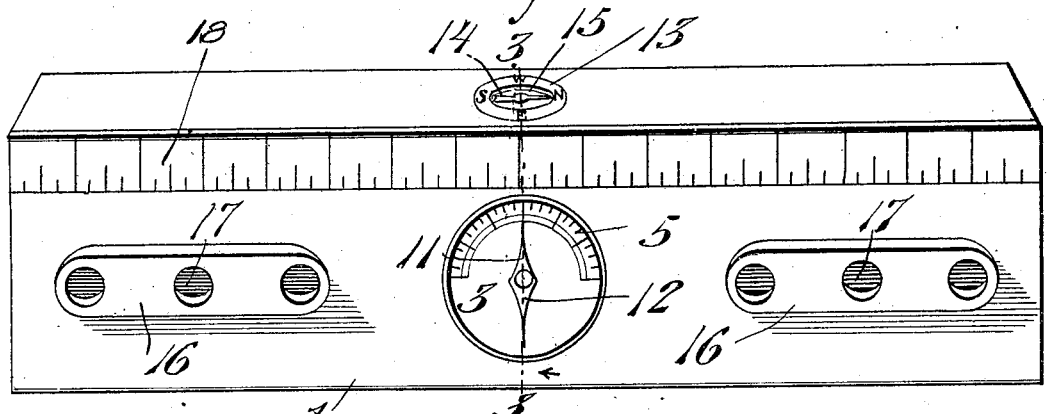
Figure 2:
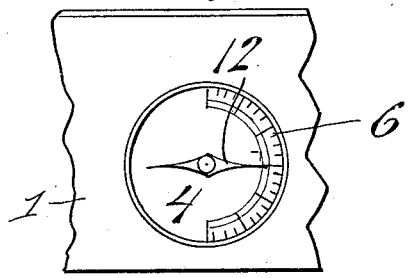
Figure 3:
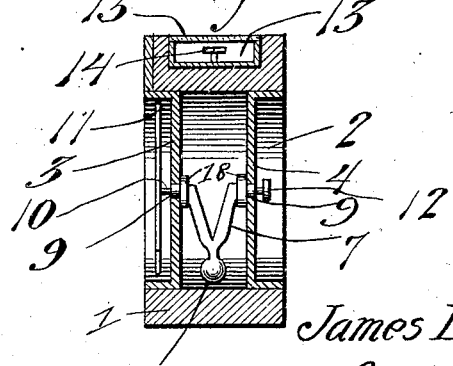

In the accompanying drawings: Figure 1 is a perspective view of an instrument embodying the invention. Fig. 2 is a detail view in side elevation of the plumb. Fig. 3 is a cross section taken on the line 3—3 of Fig. 1 and viewed in the direction of the arrow.

Referring to the drawings, 1 designates the body of the instrument of the usual or any appropriate material and preferably of the form shown having at its longitudinal center a transverse circular opening 2 in which is fitted a pair of relatively spaced dial members or plates 3 and 4 provided respectively with degree marks or graduations 5 and 6, there being suspended between the dial plates a V-shaped, oscillatory member or pendulum 7 provided at its lower end with a weight 8 and at the upper end of its arms with horizontal bearing trunnions 9 journaled in suitable bearing openings provided centrally in the dial plates, while formed on the trunnions 9 are horizontal staffs 10 to which are fixed pointers 11, 12, designed for movement respectively over the dials.

Countersunk into the normally upper edge of the body 1 and in line with the vertical axis of the dial 3 is a compass 13 of usual construction having a needle 14 and a glass or other transparent cover 15, while fixed at appropriate points to the sides of the body 1 are grip pieces or plates 16 provided with finger-receiving openings or recesses 17, there being extended along one side of the body and preferably at its normally upper edge a scale 18 graduated in inches and fractions thereof.

In practice, when the instrument is employed as a level, it is arranged as usual in a horizontal position upon the wall or other surface to be trued and the levelness of the surface determined by the pointer 11 acting in conjunction with the dial 5, while the pointer 12, which is set at right angles and in fixed relation to the pointer 11, is brought into play in determining the vertical plumb of the wall or surface, it being noted in this construction that the proper angles for rafters or the like may be obtained by the movements of the pointers over their respective dials. In setting a wall or foundation the direction thereof may be conveniently and accurately determined owing to the position of the compass 13, while the grip pieces 16 permit convenient handling of the instrument and obviate liability of the latter being accidentally dropped. It will be observed that owing to the peculiar formation of the pendulum 7, as shown, the same may swing freely under the influence of gravity for moving the pointers over their respective dials. It will also be noted that the diverged members comprising the pendulum may be separated or brought together at their free ends within certain limits thereby adapting the trunnions 9 to the distance between the dials 3 and 4 so as to prevent any possible lateral play of the pendulum which would materially impair the accuracy and efficiency of the instrument. Collars 18 are formed at the inner ends of the trunnions 9 and engage with the dials 3 and 4 and limit the movement thereof as also forming stops to prevent any lateral play of the pendulum.

From the foregoing it is apparent that I produce a simple device admirably adapted for the attainment of the ends in view, it being understood that in attaining these ends minor changes in the details herein set forth may be resorted to without departing from the spirit of the invention.

Having thus described my invention, what I claim as new is:

1. In an instrument of the character described, the combination of a body provided at opposite sides with dials having central openings, a pendulum comprising diverged members provided at their free ends with outwardly extended trunnions mounted in the openings of said dials and having staffs at the outer ends of said trunnions, the lower end of the pendulum being weighted, and pointers attached to the outer ends of said staffs and coöperating with the respective dials.

2. In an instrument of the character set forth, the combination of a body having an opening extended therethrough, dials fitted in opposite ends of said opening and provided with centrally disposed openings, a pendulum arranged in the space formed between said dials and comprising diverged members weighted at their lower ends and having trunnions at their upper ends mounted in the openings of the dials and formed with staffs at the outer ends of the trunnions, and having collars at the bases of said trunnions to engage with the inner walls of said dials, and pointers attached to the outer ends of said staffs and having a right angular arrangement.

In testimony whereof I, affix my signature in presence of two witnesses.

JAMES E. McMAHAL.

Witnesses:
L. M. YARBER,
WM. CHAFFEE.